(12) United States Patent
Podschwadt

(10) Patent No.: US 12,323,025 B2
(45) Date of Patent: Jun. 3, 2025

(54) HEAT EXCHANGER SYSTEM FOR AN ELECTRIC MOTOR WITH FLUID CIRCUITS ARRANGED BETWEEN SHAFTS

(71) Applicant: Schaeffler Technologies AG & Co. KG, Herzogenaurach (DE)

(72) Inventor: Maximilian Podschwadt, Saline, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 229 days.

(21) Appl. No.: 17/971,891

(22) Filed: Oct. 24, 2022

(65) Prior Publication Data
US 2024/0136885 A1   Apr. 25, 2024
US 2024/0235318 A9   Jul. 11, 2024

(51) Int. Cl.
| | |
|---|---|
| H02K 5/02 | (2006.01) |
| F16H 57/04 | (2010.01) |
| H02K 5/18 | (2006.01) |
| H02K 5/20 | (2006.01) |
| H02K 7/116 | (2006.01) |
| H02K 9/19 | (2006.01) |

(52) U.S. Cl.
CPC ......... *H02K 5/203* (2021.01); *F16H 57/0415* (2013.01); *F16H 57/0471* (2013.01); *F16H 57/0476* (2013.01); *H02K 5/18* (2013.01); *H02K 7/116* (2013.01); *H02K 9/19* (2013.01); *F16C 2380/26* (2013.01)

(58) Field of Classification Search
CPC ......... H02K 7/003; H02K 7/006; H02K 9/19; H02K 5/124; H02K 3/52; H02K 3/527; H02K 3/34; H02K 3/345; H02K 3/18; H02K 19/02; H02K 19/16; H02K 19/38; H02K 9/22; H02K 9/02; H02K 11/33; H02K 1/32; H02K 5/20; H02K 5/203; B60L 1/02; B60L 1/08; B60L 50/50
USPC ............... 310/52–59, 61, 216.074, 216.091, 310/261.1–266, 216.001, 216, 4, 262, 310/433, 216.132, 216.086, 79, 216.013, 310/216.004, 269
See application file for complete search history.

(56) References Cited

U.S. PATENT DOCUMENTS 2,862,120 A * 11/1958 Onsrud ................. H02K 5/203
                                                     165/47
3,521,094 A *  7/1970 Widder ................. H02K 9/197
                                                     310/58

(Continued)

FOREIGN PATENT DOCUMENTS

JP        2021080967 A  *  5/2021

OTHER PUBLICATIONS

JP2021080967A English Translation.*

*Primary Examiner* — Maged M Almawri
(74) *Attorney, Agent, or Firm* — Volpe Koenig

(57) ABSTRACT

A heat exchanger assembly is disclosed herein for an electric motor. The heat exchanger assembly can include two fluid circuits: a first circuit for water and a second circuit for oil. The water fluid circuit is configured to cycle cool water through a housing including a heat exchanger element. The oil fluid circuit is configured to supply oil to the area of the heat exchanger element. In one aspect, the oil is supplied to a space defined between a rotor shaft and the housing. The static heat exchanger is packaged coaxially between two rotating shafts.

20 Claims, 2 Drawing Sheets

(56) References Cited

U.S. PATENT DOCUMENTS

| | | | | |
|---|---|---|---|---|
| 3,681,628 A * | 8/1972 | Krastchew | ............... | H02K 9/00 310/52 |
| 3,863,083 A * | 1/1975 | Jaeschke | ............... | H02K 9/197 310/58 |
| 4,276,747 A * | 7/1981 | Faldella | ............... | F01K 25/06 60/676 |
| 4,285,107 A * | 8/1981 | Kusters | ............... | F16C 13/00 29/895.212 |
| 4,315,172 A * | 2/1982 | Intichar | ............... | H02K 9/225 310/64 |
| 4,323,803 A * | 4/1982 | Danko | ............... | H02K 9/10 165/104.19 |
| 4,346,361 A * | 8/1982 | Sauer | ............... | H01F 27/322 336/60 |
| 4,382,585 A * | 5/1983 | Fischer | ............... | C21B 7/10 266/190 |
| 4,406,610 A * | 9/1983 | Duijvestijn | ............... | F23D 14/20 239/404 |
| 4,412,515 A * | 11/1983 | Fritzenwenger | ............... | F02B 61/02 123/198 C |
| 4,470,950 A * | 9/1984 | Hyde | ............... | G21F 5/008 976/DIG. 344 |
| 4,499,926 A * | 2/1985 | Friberg | ............... | H01B 9/001 138/123 |
| 4,530,315 A * | 7/1985 | Mezger | ............... | F02B 75/22 123/41.74 |
| 4,553,585 A * | 11/1985 | Pfleger | ............... | F01P 11/08 165/145 |
| 4,587,659 A * | 5/1986 | Ungar | ............... | F27D 11/10 373/69 |
| 4,616,484 A * | 10/1986 | Mehdi | ............... | F25B 41/20 62/243 |
| 4,629,397 A * | 12/1986 | Schweitzer | ............... | F01D 5/284 416/241 B |
| 4,790,721 A * | 12/1988 | Morris | ............... | F01D 5/284 416/241 B |
| 4,818,906 A * | 4/1989 | Kitamura | ............... | H02K 9/197 310/58 |
| 4,864,173 A * | 9/1989 | Even | ............... | H02K 49/043 188/161 |
| 4,933,593 A * | 6/1990 | Gerritsen | ............... | H01J 29/006 348/832 |
| 5,189,325 A * | 2/1993 | Jarczynski | ............... | H02K 9/197 310/61 |
| 5,209,283 A * | 5/1993 | Miltzow | ............... | B22D 11/1287 492/46 |
| 5,293,089 A * | 3/1994 | Frister | ............... | H02K 5/203 310/64 |
| 5,494,424 A * | 2/1996 | Schnell | ............... | F04C 29/04 418/83 |
| 5,551,382 A * | 9/1996 | Bauer | ............... | F02F 1/40 123/193.5 |
| 5,616,973 A * | 4/1997 | Khazanov | ............... | H02K 5/203 310/58 |
| 5,664,916 A * | 9/1997 | Link | ............... | B23Q 1/70 310/58 |
| 5,682,292 A * | 10/1997 | Salanki | ............... | H01F 27/2876 336/62 |
| 5,758,718 A * | 6/1998 | de Lazzer | ............... | F28D 9/00 165/149 |
| 5,774,517 A * | 6/1998 | Palavecino | ............... | G21C 15/02 376/377 |
| 5,915,346 A * | 6/1999 | Rehr | ............... | F02F 1/14 123/41.82 R |
| 6,047,895 A * | 4/2000 | Pastleitner | ............... | F01P 7/14 236/34.5 |
| 6,167,847 B1 * | 1/2001 | Ergezen | ............... | F02F 1/16 123/41.79 |
| 6,191,511 B1 * | 2/2001 | Zysset | ............... | H02K 9/197 310/59 |
| 6,198,183 B1 * | 3/2001 | Baeumel | ............... | H02K 5/225 310/52 |
| 6,222,289 B1 * | 4/2001 | Adames | ............... | H02K 5/203 310/58 |
| 6,257,326 B1 * | 7/2001 | Heinrich | ............... | C21B 7/10 165/169 |
| 6,300,693 B1 * | 10/2001 | Poag | ............... | H02K 5/203 310/58 |
| 6,445,094 B1 * | 9/2002 | Lonardi | ............... | H02K 5/203 212/331 |
| 6,900,561 B2 * | 5/2005 | Vlemmings | ............... | H02K 5/203 310/58 |
| 6,909,210 B1 * | 6/2005 | Bostwick | ............... | H02K 5/203 310/58 |
| 7,314,037 B2 * | 1/2008 | Roithinger | ............... | F01L 13/06 123/41.31 |
| 7,489,057 B2 * | 2/2009 | Zhou | ............... | H02K 9/197 310/61 |
| 7,591,147 B2 * | 9/2009 | Masoudipour | ............... | H02K 5/20 62/505 |
| 7,675,209 B2 * | 3/2010 | Masoudipour | ............... | H02K 5/203 310/89 |
| 7,992,535 B2 * | 8/2011 | Steiner | ............... | F02B 39/14 123/196 AB |
| 8,061,131 B2 * | 11/2011 | Kuhlbach | ............... | F02B 75/18 123/193.5 |
| 8,080,908 B2 * | 12/2011 | Matsubara | ............... | H02K 1/32 310/156.53 |
| 8,146,543 B2 * | 4/2012 | Kuhlbach | ............... | F02F 1/243 123/193.5 |
| 8,593,021 B2 * | 11/2013 | Bradfield | ............... | H02K 5/203 310/60 A |
| 8,621,865 B2 * | 1/2014 | Mehring | ............... | F01P 3/12 60/605.3 |
| 8,823,223 B2 * | 9/2014 | Han | ............... | B60L 3/0061 310/64 |
| 8,857,386 B2 * | 10/2014 | Kuhlbach | ............... | F02F 1/243 60/599 |
| 8,894,921 B2 * | 11/2014 | Wedde | ............... | F27D 17/004 165/104.19 |
| 8,912,694 B2 * | 12/2014 | Miura | ............... | H02K 5/203 310/58 |
| 8,970,074 B2 * | 3/2015 | Wagner | ............... | H02K 7/003 310/59 |
| 9,287,747 B2 * | 3/2016 | Balzer | ............... | H02K 9/10 |
| 10,630,134 B2 * | 4/2020 | Goldstein | ............... | H02K 5/203 |
| 11,053,942 B2 * | 7/2021 | Hamada | ............... | F04C 29/04 |
| 11,323,009 B2 * | 5/2022 | Okamoto | ............... | H02K 9/19 |
| 11,996,755 B2 * | 5/2024 | Dewolf | ............... | F04C 29/04 |
| 2002/0024262 A1 * | 2/2002 | Hayase | ............... | H01F 27/10 310/59 |
| 2003/0030333 A1 * | 2/2003 | Johnsen | ............... | H02K 1/32 310/54 |
| 2004/0080218 A1 * | 4/2004 | Weidman | ............... | H02K 1/32 310/61 |
| 2005/0023909 A1 * | 2/2005 | Cromas | ............... | H02K 5/203 310/58 |
| 2005/0145205 A1 * | 7/2005 | Haubner | ............... | F02F 1/4214 123/41.31 |
| 2005/0189095 A1 * | 9/2005 | Damsohn | ............... | F28F 1/04 165/148 |
| 2005/0268464 A1 * | 12/2005 | Burjes | ............... | F28F 3/12 29/890.035 |
| 2005/0285456 A1 * | 12/2005 | Amagi | ............... | H02K 15/14 310/43 |
| 2006/0054112 A1 * | 3/2006 | Paul | ............... | F02F 1/40 123/41.82 R |
| 2007/0012426 A1 * | 1/2007 | Rago | ............... | F28D 7/106 165/92 |
| 2008/0030085 A1 * | 2/2008 | Gizaw | ............... | H02K 5/203 165/108 |
| 2008/0223557 A1 * | 9/2008 | Fulton | ............... | F28F 3/12 361/677 |
| 2009/0315415 A1 * | 12/2009 | Elnar | ............... | H02K 9/227 310/54 |
| 2010/0007227 A1 * | 1/2010 | Smith | ............... | H02K 5/203 310/64 |

(56) References Cited

U.S. PATENT DOCUMENTS

| | | | | |
|---|---|---|---|---|
| 2010/0102647 A1* | 4/2010 | Savant | | H02K 5/203 310/52 |
| 2010/0194233 A1* | 8/2010 | Wu | | H02K 3/47 310/214 |
| 2011/0156508 A1* | 6/2011 | Minemura | | H02K 9/19 310/54 |
| 2011/0168356 A1* | 7/2011 | Knight | | H02K 11/33 165/104.19 |
| 2011/0169352 A1* | 7/2011 | Nagao | | H02K 11/33 310/59 |
| 2011/0234029 A1* | 9/2011 | Pal | | H02K 9/197 310/54 |
| 2012/0025638 A1* | 2/2012 | Palafox | | H02K 9/10 310/52 |
| 2012/0217826 A1* | 8/2012 | Jiang | | H02K 5/203 165/170 |
| 2013/0038151 A1* | 2/2013 | Ohashi | | H02K 7/086 310/59 |
| 2013/0049495 A1* | 2/2013 | Matsuo | | G06F 16/1748 310/59 |
| 2013/0119832 A1* | 5/2013 | Nagao | | H02K 5/203 310/68 B |
| 2013/0126143 A1* | 5/2013 | Sheu | | F28F 1/00 165/177 |
| 2013/0169077 A1* | 7/2013 | Takei | | H02K 9/193 310/54 |
| 2013/0234543 A1* | 9/2013 | Buttner | | B60L 3/0061 310/54 |
| 2014/0069099 A1* | 3/2014 | Rohwer | | B60L 3/0061 903/902 |
| 2014/0183988 A1* | 7/2014 | Kulkarni | | H02K 1/20 310/54 |
| 2014/0333163 A1* | 11/2014 | Horii | | H02K 9/10 310/59 |
| 2015/0130302 A1* | 5/2015 | Leberle | | H02K 9/197 310/54 |
| 2015/0263583 A1* | 9/2015 | Urata | | H02K 5/203 310/54 |
| 2015/0288255 A1* | 10/2015 | Barker | | H02K 1/2781 310/43 |
| 2016/0036276 A1* | 2/2016 | Yamagishi | | H02K 1/22 310/59 |
| 2016/0056683 A1* | 2/2016 | Nakanishi | | H02K 5/18 310/54 |
| 2016/0372983 A1* | 12/2016 | Okochi | | H02K 1/32 |
| 2019/0063438 A1* | 2/2019 | Hamada | | F04C 29/04 |
| 2019/0229584 A1* | 7/2019 | Shinozaki | | F28D 15/025 |
| 2020/0076257 A1 | 3/2020 | Piazza Galarza et al. | | |
| 2020/0251963 A1 | 8/2020 | Woody et al. | | |
| 2020/0274411 A1* | 8/2020 | Kimoto | | H02K 1/276 |

* cited by examiner

HEAT EXCHANGER SYSTEM FOR AN ELECTRIC MOTOR WITH FLUID CIRCUITS ARRANGED BETWEEN SHAFTS

FIELD OF INVENTION

The present disclosure relates to a heat exchanger system and more particularly relates to a heat exchanger system for an electric motor.

BACKGROUND

Heat exchanger systems are well known and generally are configured to remove heat from or cool other components. In electric motor arrangements, there is an increased need to provide sufficient cooling to the rotor shaft. It is also important to protect components from damage from any cooling fluids while providing a highly efficient heat exchanger arrangement.

It would be desirable to provide an efficient heat exchanger with a package or profile that is specifically suitable for a rotor shaft of an electric motor assembly.

SUMMARY

A heat exchanger assembly is disclosed herein. The assembly can include a first fluid circuit including a first fluid circuit inlet, a first fluid circuit outlet, and a housing including a conduit that defines a first fluid circuit pathway extending between the first fluid circuit inlet and the first fluid circuit outlet. An outer surface of the housing includes at least one heat exchanger element.

A second fluid circuit can be provided that includes a second fluid circuit inlet, a second fluid circuit outlet, and a second fluid circuit pathway that extends between the second fluid circuit inlet and the second fluid circuit outlet. The second fluid circuit pathway is directed to the at least one heat exchanger element. At least a portion of the first fluid circuit pathway and at least a portion of the second circuit fluid pathway can be configured to be arranged coaxially between a first shaft and a second shaft that are drivingly connected with each other.

The first fluid circuit can include water, and the second fluid circuit can include oil. The fluids or substances used for cooling can vary, and can also include air or other cooling fluids.

The oil of the second fluid circuit can be configured to provide an oil film between adjacent radial surfaces of the second shaft and the housing. A first seal can define a first axial boundary for the oil film and a shoulder formed by the second shaft can define a second axial boundary for the oil film. A constriction can be defined between an edge of the housing of the first fluid circuit and an edge defined by the shoulder of the second shaft.

The second fluid circuit outlet can be configured to be directed to a gearbox that drivingly connects the first shaft and the second shaft.

The at least one heat exchanger element can include a plurality of radially extending fins. The heat exchanger element can include various structures configured to absorb thermal energy.

The first fluid circuit pathway can include at least one first axial portion and at least one second axial portion that overlaps with the at least one first axial portion.

The second fluid circuit pathway can be configured to be directed radially through the first fluid circuit, in one example. The oil can be flung radially outward through the housing of the first fluid circuit via centrifugal force.

A method of cooling an electric motor assembly is also disclosed herein. The method can include arranging a first fluid circuit and a second fluid circuit in a radial space defined between a first shaft and a second shaft. The first shaft can be an output shaft and the second shaft can be a e-motor rotor shaft. The method can include supplying water to the first fluid circuit via a first fluid circuit inlet and circulating the water through first fluid circuit pathway defined by a conduit to a first fluid circuit outlet. The conduit can be defined within a housing having at least one heat exchanger element on an outer surface. The method can include supplying oil to the second fluid circuit via a second fluid circuit inlet connected to a second fluid circuit pathway that extends between the second fluid circuit inlet and a second fluid circuit outlet. The second fluid circuit pathway can be directed towards the at least one heat exchanger element.

An electric motor sub-assembly is disclosed herein. The sub-assembly can include a rotor shaft, an output shaft arranged coaxially inside of the rotor shaft, a gearbox configured to drivingly connect the output shaft and the rotor shaft, a heat exchanger assembly including a first fluid circuit and a second fluid circuit. The first fluid circuit can include a conduit configured to circulate water and a housing including at least one heat exchanger element on an outer surface of the housing. The second fluid circuit can be configured to direct oil to at least an area defined between the outer surface of the housing and an inner surface of the rotor shaft.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
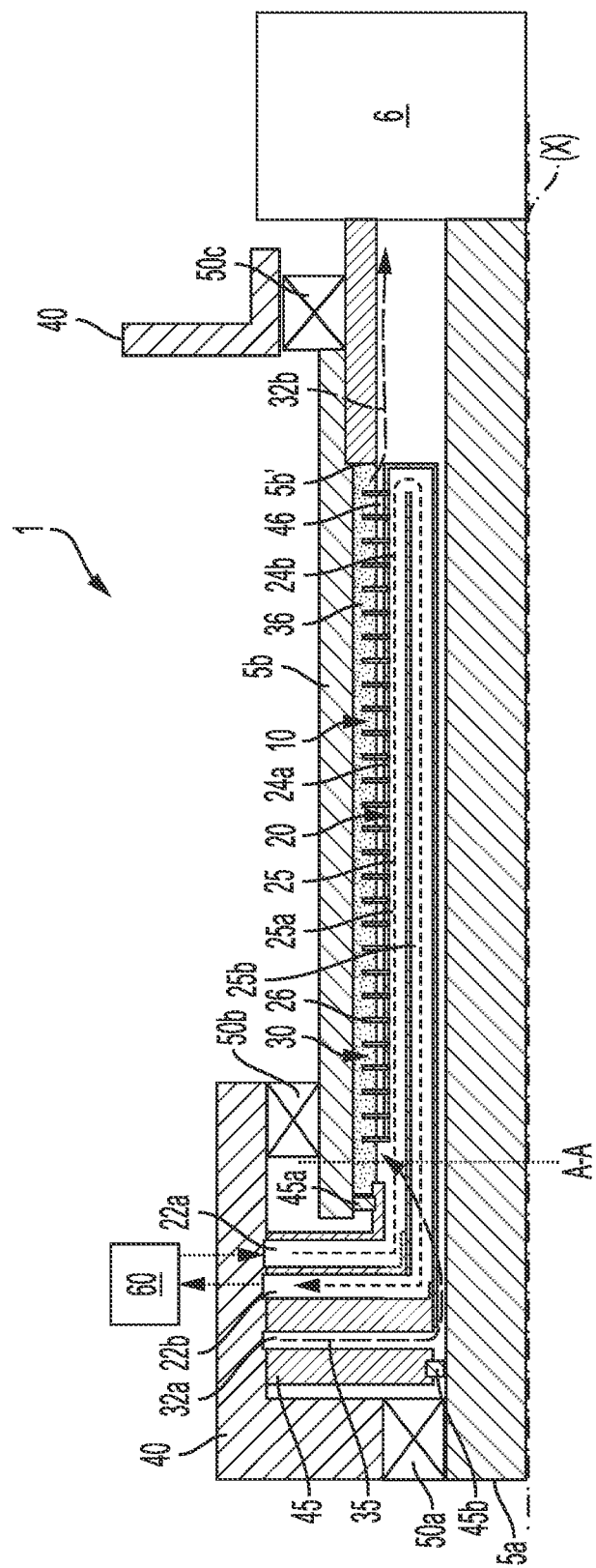
FIG. 1 is a cross-sectional view of an electric motor sub-assembly.

FIG. 1 illustrates an electric motor sub-assembly 1 generally comprising a first shaft 5a, a second shaft 5b, and a heat exchanger assembly 10.

The first shaft 5a and the second shaft 5b can be drivingly connected with each other. In one example, a gearbox 6 can be provided for drivingly connecting the two shafts 5a, 5b. Various other connection arrangements could be used.

The term heat exchanger assembly 10 as used herein can refer only to a first fluid circuit 20, or a combination of a first fluid circuit 20 and a second fluid circuit 30.

The first fluid circuit 20 can comprise a first fluid circuit inlet 22a, a first fluid circuit outlet 22b, and a housing 24a including a conduit 24b that defines a first fluid circuit pathway 25 (i.e. flow path) extending between the first fluid circuit inlet 22a and the first fluid circuit outlet 22b. In one example, fluid, such as water, is circulated through the first fluid circuit 20 in a continuous manner. In one example, the water can be circulated via water circulation system 60, such as a radiator or pump, as shown in FIG. 1. One of ordinary skill in the art would understand that the exact shape and profile of the first fluid circuit 20 can vary.

In one aspect, the housing 24a includes at least one heat exchanger element 26. For example, the at least one heat exchanger element 26 can include a plurality of fins or protrusions. One of ordinary skill in the art would understand that the exact configuration of the at least one heat exchanger element 26 can vary.

A second fluid circuit 30 is provided that includes a second fluid circuit inlet 32a, a second fluid circuit outlet 32b, and a second fluid circuit pathway 35 (i.e. flow path) that extends between the second fluid circuit inlet 32a and the second fluid circuit outlet 32b. In one example, the fluid within the second fluid circuit 30 includes oil. One of ordinary skill in the art would understand that the fluid can vary.

At least a portion of the first fluid circuit 20 and at least a portion of the second fluid circuit 30 are configured to be arranged coaxially between the first shaft 5a and the second shaft 5b. More specifically, at least a portion of the first fluid circuit pathway 25 and at least a portion of the second circuit fluid pathway 35 are configured to be arranged coaxially between the first shaft 5a and the second shaft 5b.

The second fluid circuit pathway 35 is directed to the at least one heat exchanger element 26. The oil of the second fluid circuit 30 can be configured to form or provide an oil film 36 between adjacent radial surfaces of the second shaft a and the housing 24a. This oil film 36 can immerse the heat exchanger element 26, i.e. the plurality of fins.

A first seal 45a can define a first axial boundary for the oil film 36 and a constriction 46 (i.e. passageway) can define a second axial boundary for the oil film 36. The constriction 46 can be defined between an edge of the housing 24a of the first fluid circuit 20 and an edge defined by the second shaft 5b, which can be defined by a shoulder 5b' of the second shaft 5b. The shoulder 5b' can be defined between two sections of the second shaft 5b having a varying inner diameter. The depth of the shoulder 5b' controls the volume of the oil film 36. If the shoulder 5b' is larger (i.e. deeper in a radial direction), then more oil film 36 can accumulate. In one aspect, the shoulder 5b' can serve as a dam for the oil. Properties of the oil film 36, such as its volume, depth, etc., can be controlled by adjusting the length of the housing 24a, the depth of the shoulder 5b', or other aspects of the geometry of the second shaft 5b, for example.

The second fluid circuit outlet 32b can be configured to be directed to a gearbox 6 that drivingly connects the first shaft 5a and the second shaft 5b. In one example, the second fluid circuit outlet 32b is defined by the constriction 46. Accordingly, oil that is used for lubrication and heat exchange purposes between the second shaft 5b and the housing 24a can further be used to lubricate gears and other driving elements within the gearbox 6.

The first fluid circuit pathway 25 can have various shapes and profiles. In one example, the first fluid circuit pathway 25 can include at least one first axial portion 25a and at least one second axial portion 25b that overlaps with the at least one first axial portion 25a. This shape can be modified depending on the specific operation requirements of an application. For example, coaxial pipes, coils, coiled pipes, or multiple individual pipes could be used. An external cooling system can be configured to cool the water within the first fluid circuit 20.

Figure 2:
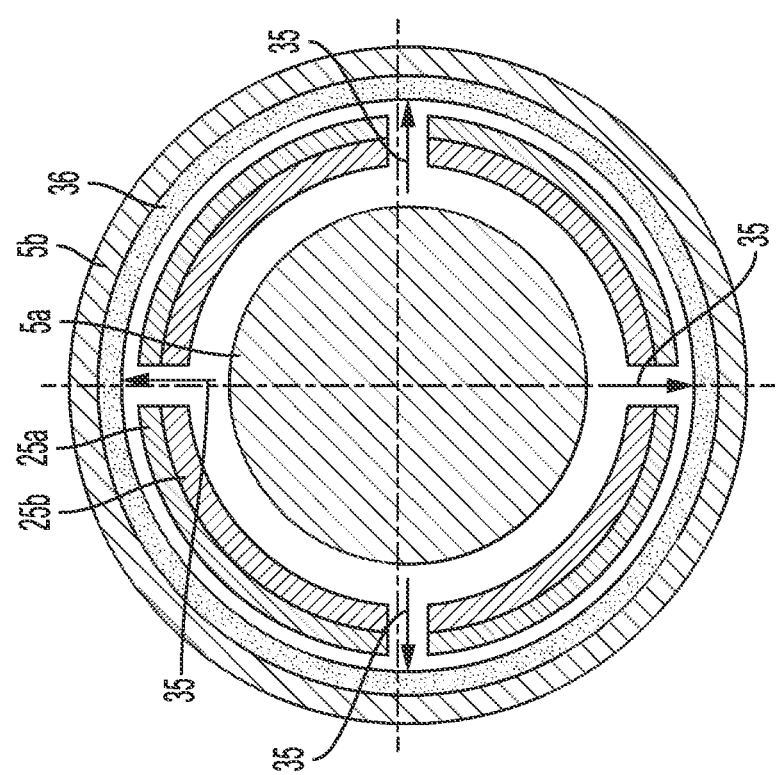
FIG. 2 is a magnified cross-sectional view of a portion of the electric motor sub-assembly taken along line A-A of FIG. 1.

FIG. 2 shows a cross-sectional view that further illustrates aspects of the heat exchanger. As shown clearly in FIG. 2, the second fluid circuit pathway 35 can be configured to be directed radially through the first fluid circuit 20. In this configuration, fluid (i.e. oil) within the second fluid circuit pathway 35 can be initially fed to a generally radially inner portion of the assembly and then flung radially outward through the first fluid circuit 20 (such as via radial slots or openings) towards the heat exchanger element 26 and an interior surface of the second shaft 5b to form the oil film 36.

In one example, the configuration of the fins of the at least one heat exchanger element 26 are configured to maximize surface contact with the oil, but also minimize drag losses. The thickness of depth of the oil film 36 is configured to efficiently and quickly absorb heat created by losses inside of the second shaft a (i.e. rotor shaft) and transmit this thermal energy efficiently to the water within the housing 24a.

Various support structure or surrounding components can be implemented or used. For example, a housing 40 can provide external support, such as via bearings 50a, 50b, 50c, to the shafts 5a, 5b. A manifold 45 can be supported by the housing 40 and can define at least the inlet 22a and outlet 22b for the first fluid circuit 20 and at least an inlet 32a for the second fluid circuit 30. The manifold 45 can be supported against the shafts 5a, 5b via seals 45a, 45b. The seals 45a, 45b, which can be dynamic seals, can generally define boundaries or seals for the oil within the second fluid circuit 30. One of ordinary skill in the art would understand that various other bearings, housing elements, seals, etc. can be implemented within the structure disclosed herein.

In another example, a method of cooling an electric motor assembly is also disclosed herein. The method can include arranging a first fluid circuit 20 and a second fluid circuit 30 in a radial space defined between a first shaft 5a and a second shaft 5b. In one example, the first shaft 5a is an input shaft and the second shaft 5b is a e-motor rotor shaft, although one of ordinary skill in the art would understand that this concept can be adapted for various applications.

As shown in FIG. 1, a gap can be defined a radially outer surface of the first shaft 5a and a radially inner surface of the housing 24a. This gap can be configured to be large enough to allow some oil to be fed to this area, and then directed radially outward to the second shaft 5b. In one configuration, oil can be fed directly to the space defined between the radially outer surface of the housing 24a and the radially inner surface of the second shaft 5b. One of ordinary skill in the art would understand that the inlet for either of the circuits 20, 30 can be modified depending on the specific requirements for a particular application.

The method can include providing water to the first fluid circuit 20 via a first fluid circuit inlet 22a and circulating the water through first fluid circuit pathway 25 defined by a conduit 24b to a first fluid circuit outlet 22b. The conduit 24b can be defined within a housing 24a having at least one heat exchanger element 26 on an outer surface, which can include a plurality of radially outward fins. The method can include supplying oil to the second fluid circuit 30 via a second fluid circuit inlet 32a connected to a second fluid circuit pathway 35 that extends between the second fluid circuit inlet 32a and a second fluid circuit outlet 32b. The second fluid circuit pathway 35 can be directed to flow along the at least one heat exchanger element 26, such that the at least one heat exchanger element 26 is immersed in the oil of the second fluid circuit 30. The method can further include directing the oil from the second fluid circuit outlet 32b to a gearbox 6 that drivingly connects the first shaft 5a and the second shaft 5b. In one example, the method can include flinging the oil radially outward and through the housing 24a of the first fluid circuit 20. One of ordinary skill in the art would understand that the oil can be directed towards the space defined between the housing 24a and the second shaft 5b according to a variety of ways.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS electric motor sub-assembly 1
first shaft 5a
second shaft 5b
shoulder 5b' of second shaft
gearbox 6
heat exchanger assembly 10
first fluid circuit 20
first fluid circuit inlet 22a
first fluid circuit outlet 22b
housing 24a
conduit 24b
first fluid circuit pathway 25
first axial portion 25a of first fluid circuit pathway
second axial portion 25b of first fluid circuit pathway
second fluid circuit 30
second fluid circuit inlet 32a
second fluid circuit outlet 32b
second fluid circuit pathway 35
oil film 36
housing 40
manifold 45
seals 45a, 45b
constriction 46
bearings 50a, 50b, 50c
water circulation system 60

What is claimed is:

1. A heat exchanger assembly comprising:
a first fluid circuit including a first fluid circuit inlet, a first fluid circuit outlet, and a housing including a conduit that defines a first fluid circuit pathway extending between the first fluid circuit inlet and the first fluid circuit outlet, the housing having at least one heat exchanger element; and
a second fluid circuit including a second fluid circuit inlet, a second fluid circuit outlet, and a second fluid circuit pathway that extends between the second fluid circuit inlet and the second fluid circuit outlet, wherein the second fluid circuit pathway is directed to the at least one heat exchanger element;
wherein at least a portion of the first fluid circuit pathway and at least a portion of the second circuit fluid pathway are configured to be arranged coaxially between a first shaft and a second shaft that are drivingly connected with each other.

2. The heat exchanger assembly according to claim 1, wherein the second fluid circuit outlet is configured to be directed to a gearbox that drivingly connects the first shaft and the second shaft.

3. The heat exchanger assembly according to claim 1, wherein the at least one heat exchanger element includes a plurality of radially extending fins.

4. The heat exchanger assembly according to claim 1, wherein the first fluid circuit pathway includes at least one first axial portion and at least one second axial portion that overlaps with the at least one first axial portion.

5. The heat exchanger assembly according to claim 1, wherein the second fluid circuit pathway is configured to be directed radially through the first fluid circuit.

6. The heat exchanger assembly according to claim 1, wherein the first fluid circuit includes water, and the second fluid circuit includes oil.

7. The heat exchanger assembly according to claim 6, wherein the oil of the second fluid circuit is configured to provide an oil film between adjacent radial surfaces of the second shaft and the housing.

8. The heat exchanger assembly according to claim 7, further comprising a first seal defining a first axial boundary for the oil film and a shoulder defined by the second shaft defining a second axial boundary for the oil film.

9. The heat exchanger assembly according to claim 8, wherein a constriction is defined between an edge of the housing of the first fluid circuit and the shoulder of the second shaft.

10. A method of cooling an electric motor assembly, the method comprising:
arranging a first fluid circuit and a second fluid circuit in a radial space defined between a first shaft and a second shaft, wherein the first shaft is an output shaft and the second shaft is a e-motor rotor shaft;
supplying water to the first fluid circuit via a first fluid circuit inlet and circulating the water through first fluid circuit pathway defined by a conduit to a first fluid circuit outlet, wherein the conduit is defined within a housing having at least one heat exchanger element on an outer surface; and
supplying oil to the second fluid circuit via a second fluid circuit inlet connected to a second fluid circuit pathway that extends between the second fluid circuit inlet and a second fluid circuit outlet, wherein the second fluid circuit pathway is directed along the at least one heat exchanger element.

11. The method according to claim 10, further comprising directing the oil from the second fluid circuit outlet to a gearbox that drivingly connects the first shaft and the second shaft.

12. The method according to claim 10, wherein the oil is configured to be directed radially through the housing of the first fluid circuit.

13. The method according to claim 10, wherein the oil is configured to define an oil film between the housing and the second shaft.

14. The method according to claim 13, wherein the oil film is bound via a first seal defining a first axial boundary for the oil film and a shoulder defined by the second shaft defining a second axial boundary for the oil film.

15. The method according to claim 14, wherein a constriction is defined between an edge of the housing of the first fluid circuit and the shoulder of the second shaft.

16. An electric motor sub-assembly comprising:
a rotor shaft;
an output shaft arranged coaxially inside of the rotor shaft;
a gearbox configured to drivingly connect the output shaft and the rotor shaft;
a heat exchanger assembly including a first fluid circuit comprising a conduit configured to circulate water and a housing including at least one heat exchanger element on an outer surface of the housing; and
a second fluid circuit configured to direct oil to at least an area defined between the outer surface of the housing and an inner surface of the rotor shaft;
wherein at least a portion of the first fluid circuit and at least a portion of the second fluid circuit are arranged coaxially between the rotor shaft and the output shaft.

17. The electric motor sub-assembly according to claim 16, wherein the oil is configured to define a film between the outer surface of the housing and the inner surface of the rotor shaft.

18. The electric motor sub-assembly according to claim 16, wherein the oil is configured to be directed radially outward through the housing via centrifugal force from rotation of the output shaft.

19. The electric motor sub-assembly according to claim 16, wherein the oil is configured to be directed towards the gearbox via a constriction formed between a shoulder of the rotor shaft and the housing.

20. The electric motor sub-assembly according to claim 16, wherein the water of the first fluid circuit is circulated through a radiator or pump system.

* * * * *